Patented Aug. 21, 1945

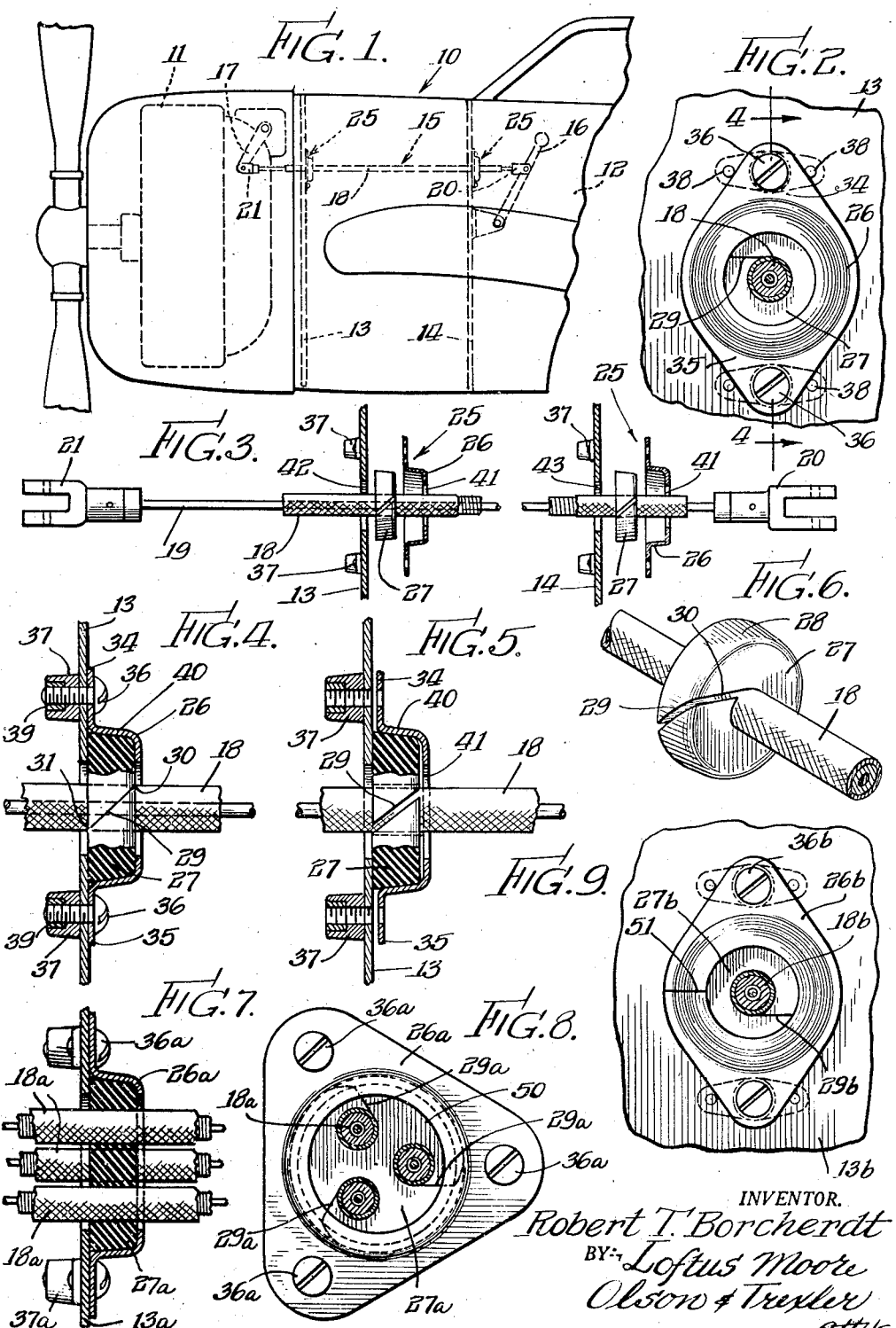

2,382,970

UNITED STATES PATENT OFFICE 2,382,970

SUPPORT

Robert T. Borcherdt, Wilmette, Ill.

Application July 29, 1942, Serial No. 452,725

4 Claims. (Cl. 248—56)

This invention relates to supports, particularly of the type adapted for supporting cables, tubes, rods, and the like in position with respect to walls or other structures through which they are adapted to extend.

It is an object of the invention to provide a support of the type defined, of improved construction and operating characteristics.

More specifically stated, it is an object of the invention to provide a grommet-like support structure for cables, tubes, rods or the like which is of improved durability, and which will be wear-resistant even though subjected to severe operating conditions such as intense vibration and the like of the supported parts.

A further object of the invention is to provide a support of simplified structure, which provides an effective liquid and gas-tight seal between the support wall and the member to be supported; and in instances wherein electric cables or wires are to be supported, which provides effective electrical insulation.

A still further object of the invention is to provide a grommet-like support structure which may be more readily assembled, and which provides for ready replacement, repair, and inspection of the supported members, without the necessity of disassembly of end fittings and the like associated with such members.

Various other objects, advantages and features of the invention will be apparent from the following specification when taken in connection with the accompanying drawing wherein certain preferred embodiments of the invention are set forth for purposes of illustration.

In the drawing, wherein like reference numerals refer to like parts throughout:

Fig. 1 is a general assembly view, diagrammatic in form, of an aircraft installation incorporating supports constructed in accordance with and embodying the principles of the invention;

Fig. 2 is a front view, on an enlarged scale, of one of the supports illustrated in Fig. 1;

Fig. 3 is a detail illustrative view showing the support elements in separated relation and illustrating more particularly the manner in which the parts are adapted to be assembled in respect to the supported cable structure;

Fig. 4 is a vertical sectional view of the structure of Fig. 2, on the line 4—4 thereof;

Fig. 5 is a view similar to Fig. 4, but showing the parts prior to the insertion of the securing bolts, the parts thereby being in an intermediate stage of assembly;

Fig. 6 is a detail perspective view more particularly illustrating the packing member mounted in position upon the cable;

Fig. 7 is a view similar to Fig. 4, but showing a modified embodiment of the invention wherein the structure is adapted for supporting a plurality of cables or the like;

Fig. 8 is a front view of the structure of Fig. 7; and

Fig. 9 illustrates a still further modified structure, similar to Fig. 2, but wherein the casing is of split construction to facilitate ready mounting upon a cable or the like to be supported.

In the drawing the supports of the invention have been illustrated as applied to an aircraft installation for supporting a transmission cable, specifically the fixed sheath of an engine control cable, with respect to various wall structures through which it is adapted to be projected between the operator's station and the device to be controlled. Such an installation is typical of the uses to which the structure of the invention may be put. It is to be understood, however, that the embodiment shown is for illustrative purposes only, and that the invention is adapted for use in various types of installations wherein one or more cables, tubes, wires, rods or like members are to be extended through wall or other structures and to be maintained in substantially fixed and supported relation in respect thereto.

Referring more specifically to the drawing, and first to the embodiment of the invention illustrated in Figs. 1 to 6 inclusive, the installation illustrated comprises an aircraft generally indicated by the numeral 10, including an engine 11 and a cockpit or operator's station 12. A wall structure 13, such as a fire wall or the like, is provided at the rear of the engine, and a wall structure 14 forms a dashboard for the control station. A transmission mechanism, generally indicated by the numeral 15 connects a control lever 16 with an operated lever 17 forming a part of the engine, such as a carburetor control or the like.

Referring to Fig. 3, the transmission mechanism more specifically comprises a stationary flexible sheath 18 composed of a wire coil or the like, and a wire or rod 19 longitudinally reciprocable within the sheath under the control of the lever 16. A pair of yoke fittings 20 and 21 are provided for securing the rod 19, respectively, to the levers 16 and 17.

The present invention concerns more particularly the supports for maintaining the transmission cable or sheath in supported relation to the walls 13 and 14 through which it is adapted to be projected. The supports, which are generally indicated by the numeral 25, comprise a casing or bracket member 26 and a packing member 27 through which the cable is adapted to pass, and which, when in assembled position, are adapted to be mounted upon the wall structure such as the wall 13 or the wall 14.

The packing member 27, as best shown in Figs. 4, 5 and 6, is of general disc-shape, but is provided with a conical periphery 28 for a purpose presently to be described. In the illustrated embodiment the packing member is preferably of synthetic rubber-like material, but may be of any suitable packing material depending upon the desired characteristics of the particular installation. As best shown in Figs. 2 and 6, the packing member is provided with a generally radially extending slit 29. This slit is angularly disposed with respect to the opposed flat faces of the disc, and is preferably cut so that its inner edge extremities merge tangentially with the central opening through the disc. This will be best understood by reference to Fig. 4 showing the parts in assembled position and wherein it will be seen that the slit portion 30 on one face of the disc is tangentially disposed with the upper extremity of the central opening through the disc, whereas the slit portion 31 on the opposite face of the disc is tangentially disposed with the lower extremity of the opening. Fig. 4 also illustrates the angular disposition of the slit 29 with respect to the opposite disc faces.

The casing member 26 is of general cup-like shape and, as best shown in Fig. 2, is provided on its flange portion with extensions 34 and 35 by means of which it is adapted to be secured to the wall structure, such as the wall 13. More specifically, these extensions are perforated for the reception of securing bolts or screws 36. In the illustrated embodiment the nuts 37, for cooperation with the bolts, are preferably permanently secured to the wall structure by suitable means such as rivets 38, Fig. 2. As illustrated, the nuts are also preferably of the self-locking type, so that the bolts will be prevented from inadvertent reverse rotation and resulting threaded disengagement, due to vibration and the like. To this end the nuts may be provided with self-locking fiber inserts, as indicated at 39, Fig. 4. The casing bracket 26 is provided with a conical surface 40 for cooperation with the conical surface 28 of the packing disc.

As best shown in Fig. 3, the central opening 41 in the casing bracket is sufficiently large so that end fittings or the like, associated with the transmission cable, such as the yoke fittings 20 and 21, may be freely passed therethrough. Similarly, the openings in the wall structures, as indicated at 42 and 43, respectively, of the walls 13 and 14, are sufficiently large so that the fittings 20 and 21 may be passed therethrough.

In assembling the structure, the cable 15, including the fittings 20 and 21, may be freely passed through the support walls 13 and 14, and the cup-like casing members 26 of the supports similarly may be freely slipped into position. The packing discs 27 may be assembled upon the cable by separating the discs at the slits 29 and slipping them radially into position. The bolts 36 are then applied and the parts brought into the position illustrated in Fig. 4. Due to the fact that the nut members 37 are permanently associated with the wall structure, the assembly operation for any given support structure may be effected entirely from but one side of the associated wall. For example, the support associated with the wall 13 may be assembled entirely from the right-hand side of the wall, as seen in Fig. 1, which may be of material advantage in installations where the left side of the wall is relatively inaccessible, or would in any event require additional assembly operators. The locking members 39 associated with the nuts hold the bolts 36 in position, after assembly. In the event it becomes necessary to remove the transmission 15 for inspection or repair, the assembly operations may be readily reversed.

The manner in which the disc-like packing member is brought into tight gripping engagement with the cable and with the cup-like casing is well illustrated by comparison of Figs. 4 and 5. It will be seen that as the bolts 36 are tightened into nuts 37, the cooperating conical surfaces 40 and 28 on the casing and packing, respectively, effect a radial compression of the packing, completely closing the slit 29, and causing the packing to become tightly gripped both to the cable 18 and to the periphery of the casing. Also, the thickness of the packing prior to assembly, is slightly greater than the depth of the casing, so that an axial as well as a radial compression of the packing member takes place upon assembly. Resultingly a completely liquid and gas-tight seal is effected between the parts, and in this connection the angular disposition of the slit 29 provides an effective seal at the slit juncture, inasmuch as the parts are clamped together by both the radial and the axial compression forces.

When the support is in use, in assembled position, any relative motion between the cable 18 and the support walls 13 and 14, due to vibration or the like, is absorbed within the body of the packing members. More specifically, the packing members have relatively wide areas of contact with the cable 18 and also with the surface of the retaining casings, and no relative motion between the packing and the cable, or between the packing and the casing, takes place at the juncture points. In view of the fact that no relative motion takes place between the contacting surfaces, the motion being absorbed within the body of the packing member itself, a support structure of increased durability even when subjected to intense vibration is provided. In instances where the supported member, such as the cable 18, is an electrical conductor, the packing affords electrical insulation between the cable and the support walls.

In Figs. 7 and 8, an embodiment of the invention is illustrated, generally similar to that previously described, but wherein the support is adapted to retain a plurality of cables or other members to be supported. In this instance the casing member, as indicated at 26a is of general triangular shape, being mounted upon the support wall structure 13a by means of three bolts 36a. The casing is provided with an enlarged central opening as indicated at 50 through which the plurality of cables 18a extend, three cables being illustrated in the particular embodiment shown. The disc-like packing member 27a is correspondingly provided with three triangularly disposed openings each having a slit 29a whereby the respective cable may be mounted in position. It is believed that the manner of construction and operation of the structure shown in Figs. 7 and 8 will be clear from what has been said heretofore in respect to the embodiment shown in Figs. 1–6.

In certain instances it may be desirable to mount the casing upon the supported cable radially rather than axially. Such a structure is illustrated at Fig. 9, wherein it will be seen that the casing member 26b is in this instance provided with a slot or severance 51 extending radially from the central opening of the casing to one edge thereof along one side margin. The structure is otherwise the same as illustrated in Figs. 1-6, and the operation is the same. As clearly illustrated in Fig. 9, it is preferred that the unsevered side of the casing be juxtaposed to the slit 29b in the packing member, so that the greater rigidity of the unsevered casing portion may be utilized to effect the clamping of the slit into a fluid-tight seal.

It is obvious that various changes may be made in the specific embodiments of the invention set forth for purposes of illustration without departing from the spirit of the invention. The invention is accordingly not to be limited to the specific embodiments shown and described, but only as indicated in the following claims.

The invention is hereby claimed as follows:

1. A support structure for cables, pipes, and the like comprising a casing, a packing of flexible material adapted to fit within the casing, said casing and packing being provided with aligned openings for receiving a cable, pipe, or like element to be supported, a support anchorage, means for securing the casing to said support anchorage, said means comprising nuts permanently fixed to the support anchorage and bolts for cooperation with said nuts extending through bolt holes in the casing, the element-receiving opening in the casing being in spaced relation from the element when in supported position, and the element-receiving opening in the packing being in tight gripping engagement with the element when in supported position, whereby the body of the packing will absorb any relative movement between the element and the support anchorage.

2. A support structure for cables, pipes, and the like comprising a casing, a packing of flexible material adapted to fit within the casing, said packing being provided with a plurality of openings adapted selectively to receive a plurality of cables, pipes, or like elements to be supported, said packing being provided with a slit extending from each of said openings to the packing periphery, said packing openings being in tight gripping engagement with the elements when in supported position, and said casing being cut away to provide opening means for receiving the elements in spaced relation to the casing, and means for securing the casing to a support anchorage.

3. A support structure for cables, pipes, and the like adapted to be extended through an apertured anchorage member, said support structure comprising a casing having radially inwardly and outwardly extending portions connected by a tapered portion forming a casing recess, a disc-shaped packing of flexible material adapted to fit within the recess of the casing, the periphery of the packing and said tapered casing portion being cooperatively shaped whereby as the packing is received within said recess it is radially compressed, said casing and packing being provided with aligned openings for receiving a cable, pipe, or the like to be supported, means for securing the casing to said apertured anchorage member, the packing being forced into the casing recess as the casing is mounted upon said anchorage member, and said packing being provided with a slit extending radially through the packing from said opening to the periphery thereof, the slit being forced into closed relation as the packing is forced into the casing recess.

4. A support structure as defined in claim 3, wherein the radial slit of the packing forms an acute angle with the opposite faces of the disc, the inner extremities of the slit on the opposite disc faces merging tangentially with said disc opening.

ROBERT T. BORCHERDT.